US007533409B2

(12) United States Patent
Keane et al.

(10) Patent No.: US 7,533,409 B2
(45) Date of Patent: May 12, 2009

(54) METHODS AND SYSTEMS FOR FIREWALLING VIRTUAL PRIVATE NETWORKS

(75) Inventors: John Keane, Metuchen, NJ (US); Christopher Macey, Red Bank, NJ (US); Samuel Bendinelli, Princeton, NJ (US)

(73) Assignee: Corente, Inc., East Brunswick, NJ (US)

( * ) Notice: Subject to any disclaimer, the term of this patent is extended or adjusted under 35 U.S.C. 154(b) by 914 days.

(21) Appl. No.: 10/345,145

(22) Filed: Jan. 16, 2003

(65) Prior Publication Data
US 2003/0131263 A1 Jul. 10, 2003

Related U.S. Application Data

(63) Continuation-in-part of application No. 09/814,178, filed on Mar. 22, 2001, now Pat. No. 7,181,542.

(51) Int. Cl.
*G06F 21/20* (2006.01)
(52) U.S. Cl. .......................................... 726/13; 713/153
(58) Field of Classification Search ........................ None
See application file for complete search history.

(56) References Cited

U.S. PATENT DOCUMENTS

| | | | | |
|---|---|---|---|---|
| 5,390,188 | A * | 2/1995 | Dawson | ............... 714/717 |
| 5,825,772 | A | 10/1998 | Dobbins et al. | ............. 370/396 |
| 5,864,666 | A | 1/1999 | Shrader | ............. 395/187.01 |
| 5,875,472 | A | 2/1999 | Bauman et al. | ............. 711/150 |
| 5,918,019 | A | 6/1999 | Valencia | ............. 395/200.57 |
| 6,041,166 | A | 3/2000 | Hart et al. | ............. 395/200.68 |
| 6,061,796 | A | 5/2000 | Chen et al. | |
| 6,092,200 | A | 7/2000 | Muniyappa et al. | ............ 713/201 |
| 6,094,437 | A | 7/2000 | Loehndorf, Jr. et al. | |

(Continued)

FOREIGN PATENT DOCUMENTS

EP      0 302 646 A2    2/1989

(Continued)

OTHER PUBLICATIONS

Kent et al., IP Encapsulating Security Payload, Nov. 1998.*

(Continued)

*Primary Examiner*—Gilberto Barron, Jr.
*Assistant Examiner*—Izunna Okeke
(74) *Attorney, Agent, or Firm*—Finnegan, Henderson, Farabow, Garrett & Dunner, LLP

(57) ABSTRACT

Methods, apparatus, and systems are provided for processing packets between a first and a second network. When a packet is received from the first network, information for routing the first packet is identified. Based on a first set of rules for processing the first packet and the information for routing the first packet, a second packet encapsulated within the first packet is detected. In the first packet, information for routing the second packet is identified based on which a second set of rules for processing the second packet and an index are determined. The second packet is then filtered based on the index, the second set of rules, and the information for routing the second packet. In addition, the index is associated with any additional packets encapsulated within the second packet. The additional packets are also filtered based on the index and the second set of rules.

24 Claims, 9 Drawing Sheets

U.S. PATENT DOCUMENTS

| | | | |
|---|---|---|---|
| 6,104,716 A | 8/2000 | Crichton et al. | |
| 6,154,839 A | 11/2000 | Arrow et al. | |
| 6,173,399 B1 | 1/2001 | Gilbrech | 713/153 |
| 6,175,917 B1 | 1/2001 | Arrow et al. | |
| 6,195,705 B1 | 2/2001 | Leung | 709/245 |
| 6,247,054 B1 * | 6/2001 | Malkin | 709/225 |
| 6,249,523 B1 | 6/2001 | Hrastar et al. | |
| 6,339,595 B1 | 1/2002 | Rekhter et al. | 372/392 |
| 6,381,646 B2 | 4/2002 | Zhang et al. | 709/227 |
| 6,393,488 B1 | 5/2002 | Araujo | 709/245 |
| 6,407,988 B1 | 6/2002 | Agraharam et al. | 370/328 |
| 6,438,612 B1 | 8/2002 | Ylonen et al. | 709/249 |
| 6,449,272 B1 | 9/2002 | Chuah et al. | |
| 6,490,289 B1 | 12/2002 | Zhang et al. | 370/401 |
| 6,507,873 B1 | 1/2003 | Suzuki et al. | |
| 6,516,417 B1 | 2/2003 | Pegrum et al. | |
| 6,556,584 B1 * | 4/2003 | Horsley et al. | 370/465 |
| 6,615,357 B1 | 9/2003 | Boden et al. | |
| 6,631,416 B2 | 10/2003 | Bendinelli et al. | |
| 6,684,256 B1 | 1/2004 | Warrier et al. | |
| 6,697,354 B1 | 2/2004 | Borella et al. | |
| 6,701,358 B1 | 3/2004 | Poisson et al. | |
| 6,751,729 B1 | 6/2004 | Giniger et al. | |
| 6,788,681 B1 | 9/2004 | Hurren et al. | |
| 6,798,782 B1 | 9/2004 | Caronni et al. | |
| 2001/0014097 A1 | 8/2001 | Beck et al. | |
| 2001/0032273 A1 | 10/2001 | Cheng | |
| 2002/0023210 A1 | 2/2002 | Tuomenoksa | |
| 2002/0026503 A1 | 2/2002 | Bendinelli et al. | |
| 2002/0026531 A1 | 2/2002 | Keane et al. | |
| 2002/0029276 A1 | 3/2002 | Bendinelli et al. | |
| 2002/0053031 A1 | 5/2002 | Bendinelli et al. | |
| 2002/0056008 A1 | 5/2002 | Keane et al. | |
| 2002/0091859 A1 | 7/2002 | Tuomenoksa | |
| 2002/0099937 A1 | 7/2002 | Tuomenoksa | |
| 2002/0124090 A1 | 9/2002 | Poier et al. | 709/228 |
| 2003/0033401 A1 | 2/2003 | Poisson et al. | |
| 2003/0108041 A1 | 6/2003 | Aysan et al. | |
| 2003/0145104 A1 | 7/2003 | Boden et al. | |
| 2003/0158962 A1 | 8/2003 | Keane et al. | |

FOREIGN PATENT DOCUMENTS

| | | |
|---|---|---|
| EP | 0 838 930 A2 | 4/1998 |
| GB | 2 340 702 A | 2/2000 |
| WO | WO 8908887 | 9/1989 |
| WO | WO 9805467 A | 12/1998 |
| WO | WO 9859470 | 12/1998 |
| WO | WO 0011832 A | 3/2000 |
| WO | WO 01/80487 A2 | 10/2001 |
| WO | WO 0180490 A3 | 10/2001 |
| WO | WO 01/82533 A2 | 11/2001 |
| WO | WO 02/17558 A2 | 2/2002 |

OTHER PUBLICATIONS

Malkin Gary Scott, "Dial-In Virtual Private Networks Using Layer 3 Tunneling" Proceedings of the Conference on Local Computer Networks, Nov. 2, 1997.

O'Guin, S. et al., "Application of Virtual Private Networking Technology to Standards-Based Management Protocols Across Heterogeneous Firewill-Protected Networks," IEEE, pp. 1251-1255, Oct. 31, 1999.

Hurwitz Group, "How Small and Midsize Businesses Can Turn the Internet into a Private Network for Competitive Advantage," Jun. 2000, downloaded from http://www.openreach.com on Jan. 4, 2001.

Applied Technologies Group, "A Practical Guide to the Right VPN Solution," 2000, downloaded from http://www.openreach.com on Jan. 23, 2001.

OpenReach, "Demystifying VPN: An Introduction to VPN Technology," 2000, downloaded from http://www.openreach.com on Jan. 4, 2001.

OpenReach, "Private Connections/Open Networks," presented on Feb. 20, 2001.

OpenReach, "Transforming the Internet into My Private Backbone for Business: Demystifying VPNs," presented on Nov. 7, 2000.

NetworkMagazine.com, "Special Report: VPN Overlay Networks: An Answer to Networks-Based IP VPNs?," Jun. 5, 2001, downloaded from http://www.network_magazine.com on Nov. 5, 2001.

RFC-2401, S. Kent et al., "Security Architecture for The Internet Protocol," The Internet Society (1998).

RFC-2409, Harkins et al., "The Internet Key Exchange," The Internet Society (1998).

RFC-1828, Metzger et al., "IP Authentication Using Keyed MD5," The Internet Society (1995).

RFC-793, "Transmission Control Protocol," Information Sciences Institute for Defense Advanced Research Projects Agency (DARPA) (1981).

RFC-791, "Internet Protocol," Information Sciences Institute for Defense Advanced Research Projects Agency (DARPA) (1981).

RFC-2663, P. Srisuresh et al., "IP Network Address Translator (NAT) Technology and Considerations," pp. 1-30, Aug. 1999.

W. T. Teo et al., "Mobile IP extension for Private Internets Support (MPN)," Internet Drafts Archive, 'Online!, pp. 1-24, Feb. 1999, Retrieved from the Internet: URL:http://www.watersprings.org/pub/id/draft-teoyli-mobileip-mvpn-02.txt>, 'retrieved on Feb. 9, 2005!

* cited by examiner

| RULE INDEX 602 | IN INTERFACE 604 | OUT INTERFACE 606 | SOURCE ADDRESS 608 | SOURCE PORT 610 | DESTINATION ADDRESS 612 | DESTINATION PORT 614 | PROTOCOL OPTIONS 616 | DESCRIPTION 618 |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

*FIG. 6*

| RULE INDEX | PARTNER INDEX | IN INTERFACE | OUT INTERFACE | SOURCE VIRTUAL ADDRESS | SOURCE PORT | DESTINATION VIRTUAL ADDRESS | DESTINATION PORT | PROTOCOL OPTIONS | DESCRIPTION |
|---|---|---|---|---|---|---|---|---|---|
| 702 | 704 | 706 | 708 | 710 | 712 | 714 | 716 | 718 | 720 |
| | | | | | | | | | |
| | | | | | | | | | |
| | | | | | | | | | |
| | | | | | | | | | |
| | | | | | | | | | |
| | | | | | | | | | |
| | | | | | | | | | |

*FIG. 7*

METHODS AND SYSTEMS FOR FIREWALLING VIRTUAL PRIVATE NETWORKS

CROSS REFERENCE TO RELATED APPLICATION

The present application is a continuation in part of U.S. patent application Ser. No. 09/814,178, entitled "METHODS AND SYSTEM FOR MANAGING AND CONFIGURING VIRTUAL PRIVATE NETWORKS," filed Mar. 22, 2001 now U.S. Pat. No. 7,181,542, which is also expressly incorporated herein by reference in its entirety. The present application also relates to U.S. patent application Ser. No. 09/832,339, entitled "METHODS AND SYSTEMS FOR PARTNERS IN VIRTUAL NETWORKS," filed Apr. 11, 2001; U.S. patent application Ser. No. 09/832,363, entitled "METHODS AND SYSTEMS FOR HAIRPINS IN VIRTUAL NETWORKS," filed Apr. 11, 2001; U.S. patent application Ser. No. 09/832,362, entitled "METHODS AND SYSTEMS FOR USING NAMES IN VIRTUAL NETWORKS," filed Apr. 11, 2001; U.S. patent application Ser. No. 09/832,341, entitled "METHODS AND SYSTEMS FOR MANAGING VIRTUAL ADDRESSES FOR VIRTUAL NETWORKS," filed Apr. 11, 2001; U.S. patent application Ser. No. 09/832,345, entitled "METHODS AND SYSTEMS FOR PROVIDING NETWORK SERVICES USING AT LEAST ONE PROCESSOR INTERFACING A BASE NETWORK," filed Apr. 11, 2001; U.S. patent application Ser. No. 09/832,346, entitled "METHODS AND SYSTEMS FOR ENABLING COMMUNICATION BETWEEN A PROCESSOR AND A NETWORK OPERATIONS CENTER," filed Apr. 11, 2001; and U.S. patent application Ser. No. 09/832,353, entitled "METHODS AND SYSTEMS FOR AN EXTRANET," filed Apr. 11, 2001, all of which are expressly incorporated herein by reference in their entirety.

DESCRIPTION OF THE INVENTION

1. Field of the Invention

The present invention relates to systems and methods for securing networks and, more particularly, systems and methods for firewalling virtual private networks.

2. Background of the Invention

Wide area networks allow users to access company files and computer programs, regardless of where users are geographically located. Until recently, building wide area networks remained the province of only the largest corporations or companies with enough technical skill and financial resources. Organizations have used a range of approaches to building wide area networks to connect remote offices, partners, or employees. These "traditional" approaches to connectivity include, for example, point-to-point leased lines, packet switched networks, and dedicated virtual private networks (VPNs).

Point-to-point leased lines are physical networks requiring the engineering of separate links between sites that need to communicate with each other. Point-to-point leased lines can take from 30 to 90 days to install and are costly.

A packet switched network using frame relay is a traditional alternative to point-to-point leased lines that offers reduced costs and increased flexibility. Like the point-to-point solutions, the initial installation of a frame relay network takes a long time. For example, additional access circuits may usually take two to three weeks for installation and the service is fairly costly.

A more-recently introduced service offered by some network service providers is a dedicated virtual private network. This routed service eliminates the complexity and costs associated with the engineering of connections between dedicated locations, but requires the network service provider to manage security as the network is shared with other customers. A virtual private network is "virtual" because it uses a shared or a base network, such as the Internet as its backbone as opposed to a completely private network with dedicated lines. It is also "private" since the information that is exchanged between the users may be encrypted or encoded to provide privacy. Prior to the present invention, virtual private networks, dedicated point-to-point lines, and packet switched networks shared drawbacks of being cumbersome and costly.

Although traditional virtual private networks offer low access costs, they often entail high set-up, maintenance, and management costs. Based on a number of factors, a shared network, such as the Internet has evolved as the preferred backbone for connecting and internetworking multiple locations, partners, and employees. Also, the Internet offers the advantages of being ubiquitous, (available almost everywhere—small towns, large cities, around the world), offering an enormous capacity, and increasing cost-effectiveness, with fast, new access methods, such as DSL and cable modems.

With the advent and ubiquity of the Internet, virtual private networks have emerged as a way to build a private communication network over a shared public or private infrastructure or a base network. Virtual private networks provide secure private connections over the Internet by enabling authentication of users and locations, delivering secure and private "tunnels" between users or locations, and encrypting user communications.

Today, most virtual private networks are Internet Protocol (IP) based and are established through the Internet. They fall into two categories, namely hardware-based and software-based virtual private networks. Hardware-based virtual private networks require proprietary hardware platforms and claim to provide high price/performance ratios and potentially increased security through specialized functions. Network manufacturers are building some virtual private network capabilities into routers and other networking equipment.

Software-based virtual private networks have emerged as another alternative to hardware-based virtual private networks. Vendors are already adding virtual private network functionality, such as tunneling and encryption to their firewall solutions.

Although use of a base network, such as the Internet as a backbone for wide area networks may be less expensive and more flexible than traditional solutions, the associated costs and complexity of using virtual private networks has been prohibitive. As a result, most companies have been reluctant to link remote locations over the Internet using virtual private networks.

Building wide area virtual private networks over the Internet has been difficult because most robust solutions have required esoteric networking and security technologies. Merely deciding what type of virtual private network and what levels of security or encryption are required can be confusing to many information technology (IT) personnel and non-IT personnel. Beyond the complex purchase decisions, the installation and ongoing maintenance of such systems can be time-consuming, especially if the number of remote locations changes frequently. In addition, many companies have found that rolling out traditional virtual private network products requires significant logistical planning to make sure that the right hardware and software is available at all the remote locations. Initial configuration of these remote sites is often time consuming enough, without factoring in the effort required to get a remote site back on line if a location fails (especially if no skilled IT resources are available at the remote site).

Many organizations have been reluctant to establish Internet-based wide area virtual private networks also because of the increasing number of Internet security threats, such as hackers and corporate espionage. Further, virtual private networks and Internet-based connectivity solutions continue to remain prohibitively expensive. Even prepackaged virtual private network solutions require expensive networking personnel to configure, install, and manage such networks. For example, enterprise level firewall and virtual private network solutions may take up to a week to configure. In addition, the installation often requires support at the remote locations, dictating either extensive travel requirements for home office personnel or the hiring and training of remote IT support staff.

Many software-based virtual private network solutions also require the purchase of specialized and costly hardware. Moreover, although virtual private networks can save considerable amounts of money over frame relay or leased line networks, associated IT support costs often erase the savings. For example, setting up a virtual private network may necessitate hiring full-time IT professional to set up and administer the network.

As explained above, the installation and maintenance of a secure virtual private network over the Internet have been too complex, requiring financial investment in hardware, software, personnel, and/or time. To provide encryption and authentication on a virtual private network, each user must perform a variety of tasks including, for example, using an encryption algorithm that is compatible with the virtual private network; using an authentication technique that is compatible with the virtual private network; coordinating various security protocols with other users (e.g., coordinating a public key exchange) of the virtual private network; coordinating the establishment of tunnels with other users of the virtual private network; selecting and manually configuring the encryption path through the communication path; and/or recovering the virtual private network after a failure. Accordingly, the burdens of installing and administering virtual private networks are significant.

Furthermore, VPN solutions that use an enterprise level firewall to protect against threats, such as hackers on the Internet may take up to a week to configure. In addition, the installation of a VPN often requires support at the remote locations, dictating either extensive travel requirements for home office personnel or the hiring and training of remote IT support staff. In addition, since virtual private networks authenticate users and encrypt communications, firewalls assume that such users and communications can be trusted.

Unfortunately, certain users within a virtual private network may pose a security threat. For example, when an unscrupulous employee has access to certain portions of the virtual private network, he may attempt to access other portions of the network for which he is not authorized. In addition, when communicating with an external partner over a virtual private network, the external partner may pose a security threat to resources or users in the network.

It is therefore desired to provide methods and systems that address the above and other shortcomings of the prior art.

SUMMARY OF A FEW ASPECTS THE INVENTION

In accordance with an aspect of the present invention, a system comprises a first processor communicating with a second processor through a tunnel established between the first and second processors. The second processor communicates with at least one other processor through another tunnel enabled by the first processor such that the second processor processes one or more packets communicated through the other tunnel based on one or more rules, such as firewall rules, provided by the first processor.

In accordance with another aspect of the present invention, information is identified for routing a first packet received from a first network. A second packet encapsulated within the first packet is detected based on a first set of rules for processing the first packet and the information for routing the first packet. In the first packet, information for routing the second packet is identified. An index is then determined based on the information for routing the second packet and a second set of rules for processing the second packet is determined based on the index and the information for routing the second packet. The second packet is then filtered based on the index, the information for routing the second packet, and the second set of rules.

In accordance with another aspect of the present invention, a first packet is received from a first network interfacing a second network. Information indicating a source of the first packet and information for routing the first packet to at least one other network interfacing the second network are identified. A first set of rules for processing the first packet is determined based on the information for routing the first packet to the at least one other network. An index is determined based on the information for routing the first packet to the other network interfacing the second network. The first packet is processed based on the information for routing the first packet to the other network interfacing the second network and the first set of rules. Information is then determined for routing the first packet in the second network. The first packet is encapsulated within a second packet and a second set of rules is determined based on the index and the information for routing the first packet in the second network. The second packet is then filtered based on the index, the second set of rules, and the information for routing the first packet in the second network.

In accordance with another aspect of the present invention, a processor is provided a first set of rules for filtering a first packet from a network and a second set of rules for filtering a second packet encapsulated within the first packet. The second packet is received through a tunnel established through the network. An association is established between the second packet and the second set of rules based on information for routing the second packet. At least a portion of the second set of rules is then selected. The second packet is filtered based on the association, the first set of rules, and the second set of rules.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 6 is an exemplary list (or table) for providing security between a base network and a virtual private network, in accordance with methods and systems consistent with the present invention;

FIG. 7 is an exemplary list (or table) for providing security within a virtual private network, in accordance with methods and systems consistent with the present invention;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
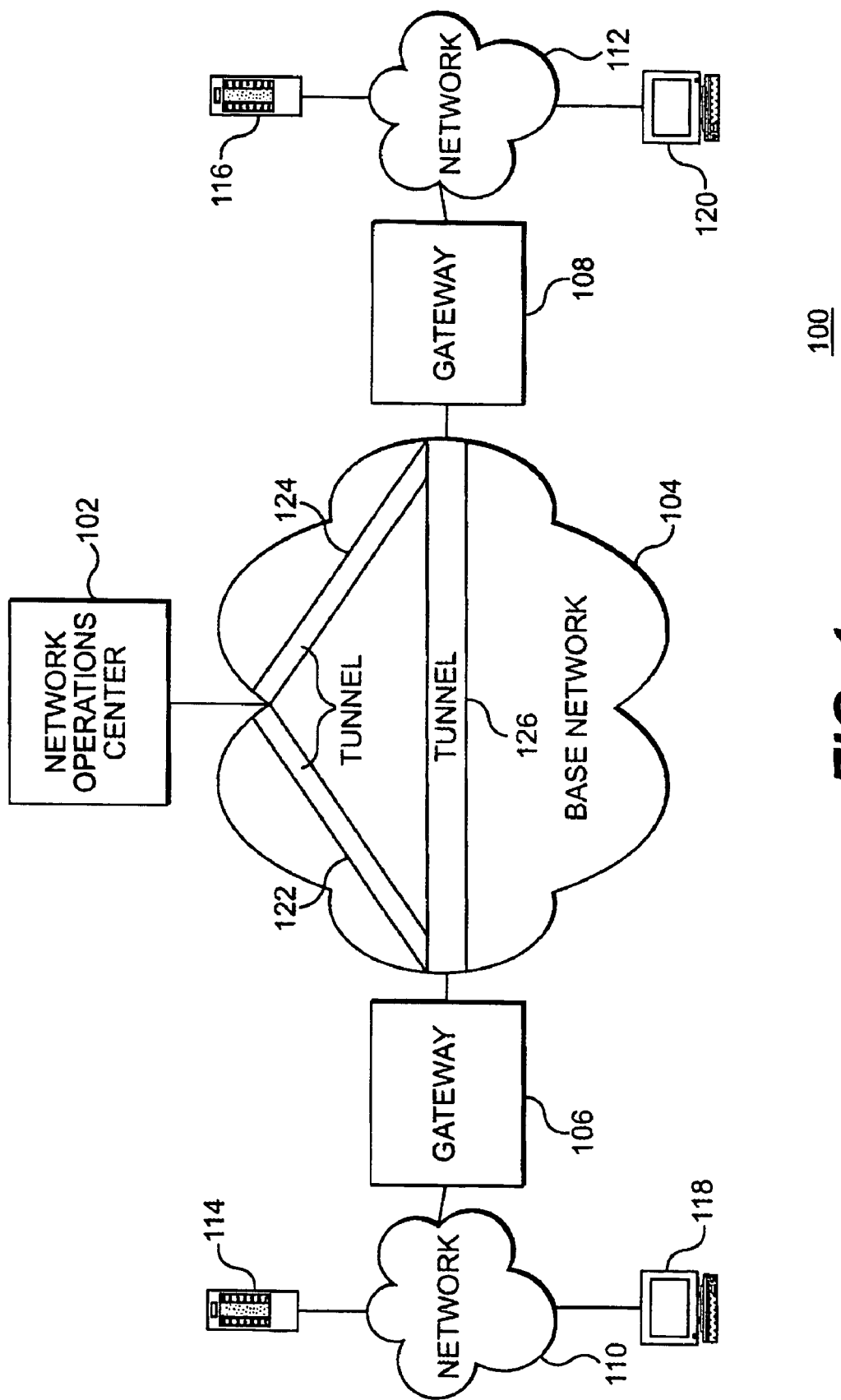
FIG. 1 is a general block diagram of an exemplary network, in accordance with methods and systems consistent with the present invention.

FIG. 1 is a general block diagram of an exemplary network 100, in accordance with methods and systems consistent with the present invention. Network 100 may include a network operations center 102, a base network 104, gateways 106 and 108, networks 110 and 112, hosts 114 and 116, and computers 118 and 120.

Network operations center 102 may enable communication and exchanges between the various entities depicted in network 100 of FIG. 1 to form a virtual network and may enable encoding or encryption to form a virtual private network. Further, network operations center 102 may exchange control and/or monitoring information, such as traffic statistics, with gateways 106 and 108. Network operations center 102 may be implemented with at least one processor including, for example, one or more of the following components (not shown): a central processing unit, a co-processor, a memory, a storage device, an input device, an output device, a network interface, a display, and/or other processing devices and systems. Network operations center 102 is further described with reference to FIG. 2.

Network operations center 102 may form a virtual private network using a first encrypted information flow 122 to exchange control information with gateway 106, and a second encrypted information flow 124 to exchange control information with gateway 108. Network operations center 102 may also enable a third encrypted information flow 126 between gateways 106 and 108 for the virtual private network.

Network operations center 102 may enable third encrypted information flow 126 after gateways 106 and 108 indicate a mutual consent. Gateways 106 and 108 may communicate their consent by identifying the names and/or addresses of the other gateway. For example, gateways 106 and 108 may indicate consent by providing the name of the other gateway to the network operations center 102 via first and second encrypted information flows 122 and 124, respectively. Other virtual private networks may include one or more encrypted information flows established through the base network 104 with other gateways (not shown) or other network operations centers (not shown).

An encrypted information flow, such as an encrypted tunnel, may be established through base network 104 by encapsulating a protocol within another protocol. For example, an encrypted tunnel may include an encapsulated Internet Protocol packet, which has been encrypted by an encryption protocol, such as RSA, Digital Encryption Standard (DES), and Triple DES (3DES). An encrypted tunnel may be established using Internet Protocol (IP) packets such that the payload of each packet is encrypted but the address of each packet is unencrypted (i.e., clear-text). As a result, the encrypted payload may be encapsulated by a clear text IP address, forming a tunnel through base network 104.

If network operations center 102 determines that the consent is mutual (i.e., that the other gateway also consents to enabling the tunnel), network operations center 102 may place gateway 106 on a list (hereinbelow referred to as a partner list) that will be provided to gateway 108. Likewise, network operations center 102 may place gateway 108 on the partner list for gateway 106. The partner lists for gateways 106 and 108 may include, for example, a virtual IP address, a real IP address, and/or other information describing each gateway. The partner lists for gateways 106 and 108 are further described with reference to FIG. 4.

Gateways 106 and 108 may then establish third encrypted information flow 126 through base network 104. Third encrypted information flow 126 may provide privacy as to the exchanged information and may also be authenticated using an Internet Protocol Security (IPSec) compliant authentication technique, such as MD-5 hashing. Also, the encryption used for third encrypted information flow 126 may be a weak encryption or encoding algorithm that provides minimal privacy or may be a strong encryption scheme that essentially guarantees privacy.

Base network 104 may facilitate communication and exchanges between the various entities depicted in network 100 of FIG. 1. Base network 104 may include a shared, public, or private network and encompass a wide area or local area. For example, base network 104 may be implemented using the Internet to facilitate communication between networks 110 and 112.

Gateways 106 and 108 may provide an entrance and an exit point for communications between base network 104 and networks 110 and 112. Network 110 may interface base network 104 via gateway 106. Network 112 may interface base network 104 via gateway 108. Gateways 106 and 108 may be implemented, for example, using one or more of the following: a computer, a server, a router, a switch, a firewall, or any other type of network element.

Networks 110 and 112 may facilitate communications for a particular person, group, or enterprise. For example, network 110 may facilitate communications between gateway 106, host 114, and workstation 118. Network 112 may facilitate communications between gateway 108, host 116, and workstation 120. Networks 110 and 112 may be implemented as local area networks or corporate intranets using technologies, such as Ethernet, Frame Relay, Asynchronous Transfer Mode, or Internet Protocols.

Workstations 118 and 120 may permit one or more users to participate in one or more virtual private networks established through base network 104 and networks 110 and 112. Workstations 118 and 120 may include one or more of the following devices: a computer, a server, a router, a switch, a firewall, a cell phone, a personal digital assistant, or any other type communication device. Workstations 118 and 120 may be stand-alone nodes directly interfacing base network 104. For example, workstation 118 may be integrated within gateway 106, such as on a stand-alone personal computer. Alternatively, workstations 118 and 120 may interface networks 110 and 112, respectively, to permit one or more users to participate in a virtual private network. In addition, workstations 118 and 120 may include software applications, such as the Netscape Navigator developed by Netscape or the Internet Explorer developed by Microsoft. Workstations 118 and 120 are further described with reference to FIG. 3. Other devices, such as printers, personal digital assistants, wireless devices, and mobile phones, may function as a workstation and participate in one or more virtual private networks established through base network 104.

Hosts 114 and 116 may provide one or more services for their respective networks 110 and 112. For example, hosts 114 and 116 may provide services including: browsing services using the Hypertext Transport Protocol ("HTTP"); file transfer services using protocols, such as Network File System ("NFS") or File Transport Protocol ("FTP"); electronic mail service; naming services, such as Domain Naming Service ("DNS"); and directory services, such as Lightweight Directory Access Protocol ("LDAP") services. Hosts 114 and 116 may be implemented using one or more servers.

Figure 2:
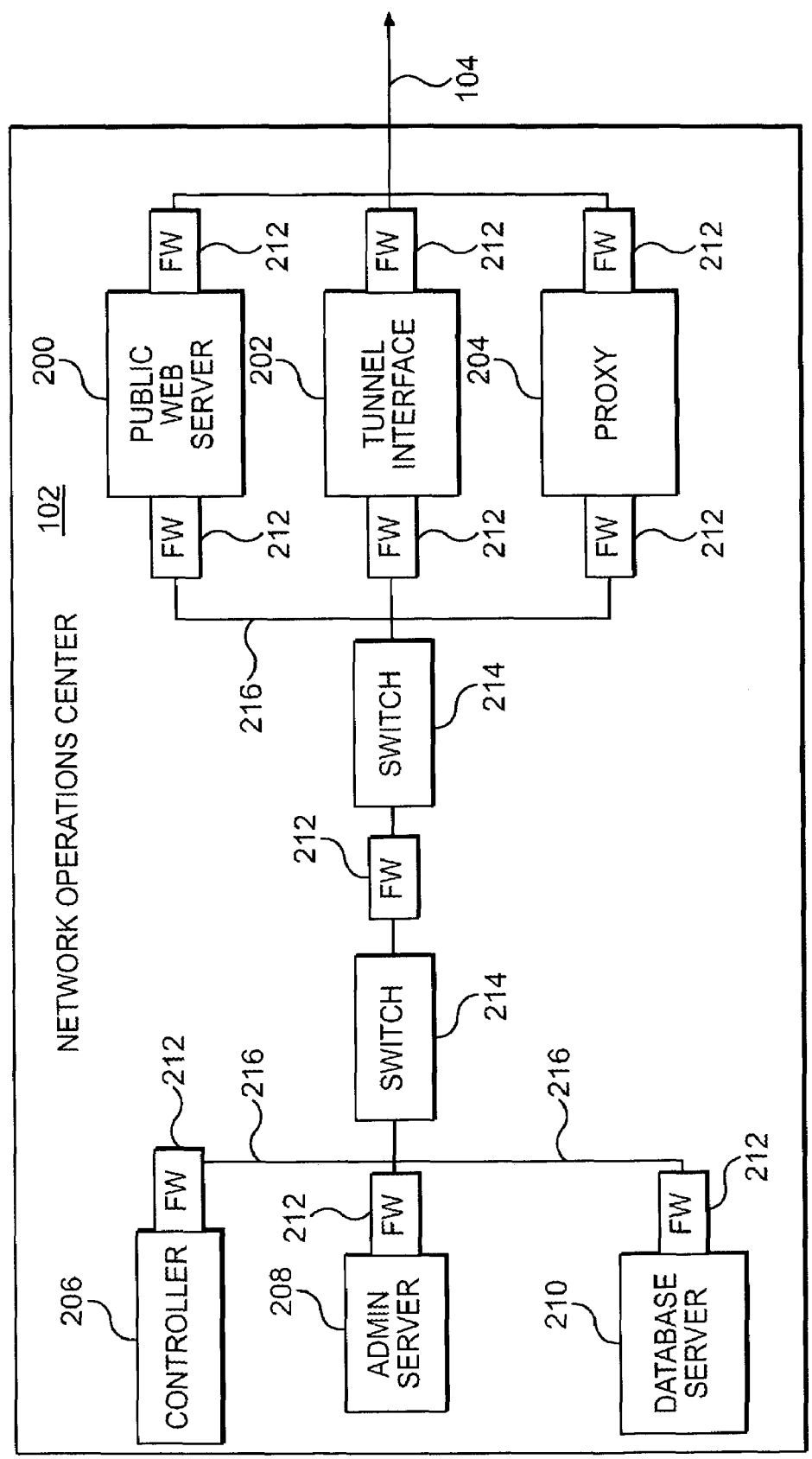
FIG. 2 is a general block diagram of an exemplary network operations center, in accordance with methods and systems consistent with the present invention.

FIG. 2 is a general block diagram of an exemplary network operations center, in which methods and systems consistent with the present invention may be implemented. Network operations center 102 may include a public web server 200, a tunnel interface module 202, a proxy module 204, a controller module 206, an administrative server 208, a database server 210, one or more firewalls 212, one or more switches 214, and a communication channel 216.

Public web server 200 may provide a user an interface to access the network operations center 102 through base network 104, and perform functions, including registering to enable and establish a virtual private network through base network 104. For example, public web server 200 may present to the user a series of questions and receive responses to the question based on which the network operations center 102 may generate program code and information for configuring a computer as a gateway, such as gateways 106 and 108, capable of participating in one or more virtual private networks.

For example, this program code and information may be provided in the form of a disk image, which may be downloaded and installed in one or more computers to configure them as gateways 106 and 108. Moreover, public web server 200 may also include one or more of the following: marketing information, trouble ticket information, and other user information that may not require privacy and/or authentication. Public web server 200 may include a firewall 212 and other security devices to limit access to switch 214 and communication channel 216 in network operation center 104. For example, the Linux "Ipchains" utility may be used to manage firewall 212.

Tunnel interface module 202 may establish tunnels between the network operations center 102 and gateways 106 and 108. Tunnel interface module 202 may include a public addressable or routable IP address that permits establishing tunnels, such as first and second encrypted flows 122 and 124, between network operations center 102 and gateways 106 and 108. Moreover, tunnel interface module 202 may include a transmission control protocol (TCP) tunnel driver used to establish a TCP tunnel between network operations center 102 and the gateways 106 and 108. For example, tunnel interface module 202 may use the TCP tunnel driver to encapsulate packets for an IPSec tunnel within TCP packets. Alternatively, tunnel interface module may use other encryption and/or tunnel software, such as a User Datagram Protocol (UDP) tunnel driver.

Tunnel interface module 202 may communicate with the other subsystems of network operations center 102 in a manner to increase security. For example, tunnel interface module 202 may provide a single control and monitoring port for exchanging messages with controller module 206 and for exchanging secured sockets layer (SSL) messages with administrative server 208. Further, the tunnel interface module 202 may use firewall 212 and/or other security devices to limit access to switch 214 and communication channel 216.

Proxy module 204 may include one or more processors, which may serve as a proxy for enabling one or more tunnels between gateways 106 and 108, when the gateways are each not accessible behind a firewall, hiding their respective real IP addresses. Alternatively, proxy module 620 may be located within one of gateways 106 and 108 or at a third party website hosting the proxy module 204.

Controller module 206 may include one or more processors, which may receive the control information provided by each of gateways 106 and 108 via first and second encrypted information flows 122 and 124, respectively. The control information provided by each of gateways 106 and 108 may also include monitoring information. Controller module 206 may also authenticate the identity of a gateway, determine that tunnels are authorized according to each gateway's list of desired partners, and add partners to each gateway's partner list.

Administrative server 208 gathers information and then may store the gathered information using database server 210 including, for example, a tunnel database that includes a list of tunnels that are active in network 100; a predefined rule or trigger that indicates when a new tunnel request is made for a tunnel that already exists and is active in the tunnel database; a database with authentication information capable of authenticating the identity of each of gateways 106 and 108 participating in a virtual private network. For example, database server 210 may store for gateways 106 and 108 the authentication information in the form of a shared secret (e.g., a bit string and/or a public key) that authenticates the identity of a gateway seeking to establish a tunnel to the network operations center or another gateway. When the shared secret stored in database server 210 matches the shared secret presented by the gateway to the network operations center 102, the gateway may be authenticated.

While encryption techniques may make communications private, authentication techniques may allow communicating parties to verify each other's identity and the authenticity of the exchanged information. Authentication serves to provide a level of trust so that users in a virtual private network may be confident about the authenticity of the exchanged information. Authentication may be performed using a variety of security techniques including, for example, a signature, a digital signature, a digital certificate, a hash code, a password, and/or any other approach that may be used to establish identity of a user or computer.

Database server 210 may perform one or more of the following: storing customer information; storing the disk image described above; generating reports, such as alarm reports, activity reports, and/or other reports for administering virtual private networks; and storing monitoring information associated with the virtual private networks.

Firewalls 212 may include one or more processors, which may selectively limit the type of information reaching communication channel 216 and switch 214. For example, firewalls 212 may only permit entry of TCP commands to a specific port number. Moreover, firewalls 212 may be implemented as a stand-alone device, software, firmware, and/or implemented as part of another processor, router, gateway, and/or any other device capable of performing the functions of a firewall.

Switches 214 switch information or traffic (e.g., datagrams, packets, or cells) between one or more of the subsystems of network operations center 102. Switches 214 may be implemented with one or more processors, a router, a switch, and/or any other communication device capable of switching and/or routing information to the appropriate subsystem within network operations center 102.

Subsystems 200-210 of network operations center 102 may be distributed along communication channel 216 that connects the subsystems. Communication channel 216 may include one or more of the features and functions described above with respect to the base network 104 of FIG. 1.

A user may use subsystems 200-210 to configure a firewall module on gateways 106 and 108 to restrict communications between base network 104, and networks 110 and 112. For example, the user may access a web page at web server 200 to configure features of firewall modules at gateways 106 and 108.

The user may establish one or more rules that selectively restrict information flowing between base network 104, and networks 110 and 112. The user may specify which types of communications services of base network 104 are enabled, such as TCP, UDP, HTTP, FTP, etc. Furthermore, the user may specify rules which route service requests for base network 104 to specific processors in networks 110 and 112, for example, by identifying the assigned addresses for hosts 114 and 116. For example, the user may specify rule at gateway 106 that routes FTP service requests to host 114 in network 110. Other rules may restrict workstation 118 from accessing through gateway 106 other processors that do not interface gateway 106 via third encrypted information flow 126, such as an Internet web site. The user may specify rules for gateway 106 to allow communications from workstation 120 through third encrypted information flow 126 to workstation 118. In addition, the user may specify rules for gateway 106 to restrict packets from workstation 120 from accessing host 114.

Once the user has configured the desired features of the firewall modules, public web server 200 may provide firewall information to gateways 106 and 108 via base network 104. Gateway 106 may receive firewall information for itself and each gateway on its partner list. The firewall information may modify and/or configure the firewall module on gateway 106 and may include rules for the firewall module, such as the protocol type permitted to traverse the firewall, a direction for the permitted protocol, allowable source and destination addresses (e.g., IP addresses and port addresses), a flag to enable the rules, a name for each rule, whether to accept packets from another firewall, and a number indicating the order in which the rule is executed in a firewall. Rules for the firewall module on gateway 106 are further described with reference to FIGS. 6 and 7.

For example, Table 1 lists exemplary XML name value pairs used by public web server 200 to providing firewall information to gateway 106. Table 1 may be stored in the network operations center 102, such as by database server 210 and indexed according to a gateway name for gateway 103 and/or virtual IP address of gateway 106.

TABLE 1

| Firewall Information |
|---|
| <firewall rule>     protocol="tcp"     direction="in"     src_ip_mask="$any"     src_port="1024:65535"     dst_ip_mask="$1"     dst_port="21"     action="ACCEPT"     rule_number="1" </firewall rule> |

Figure 3:
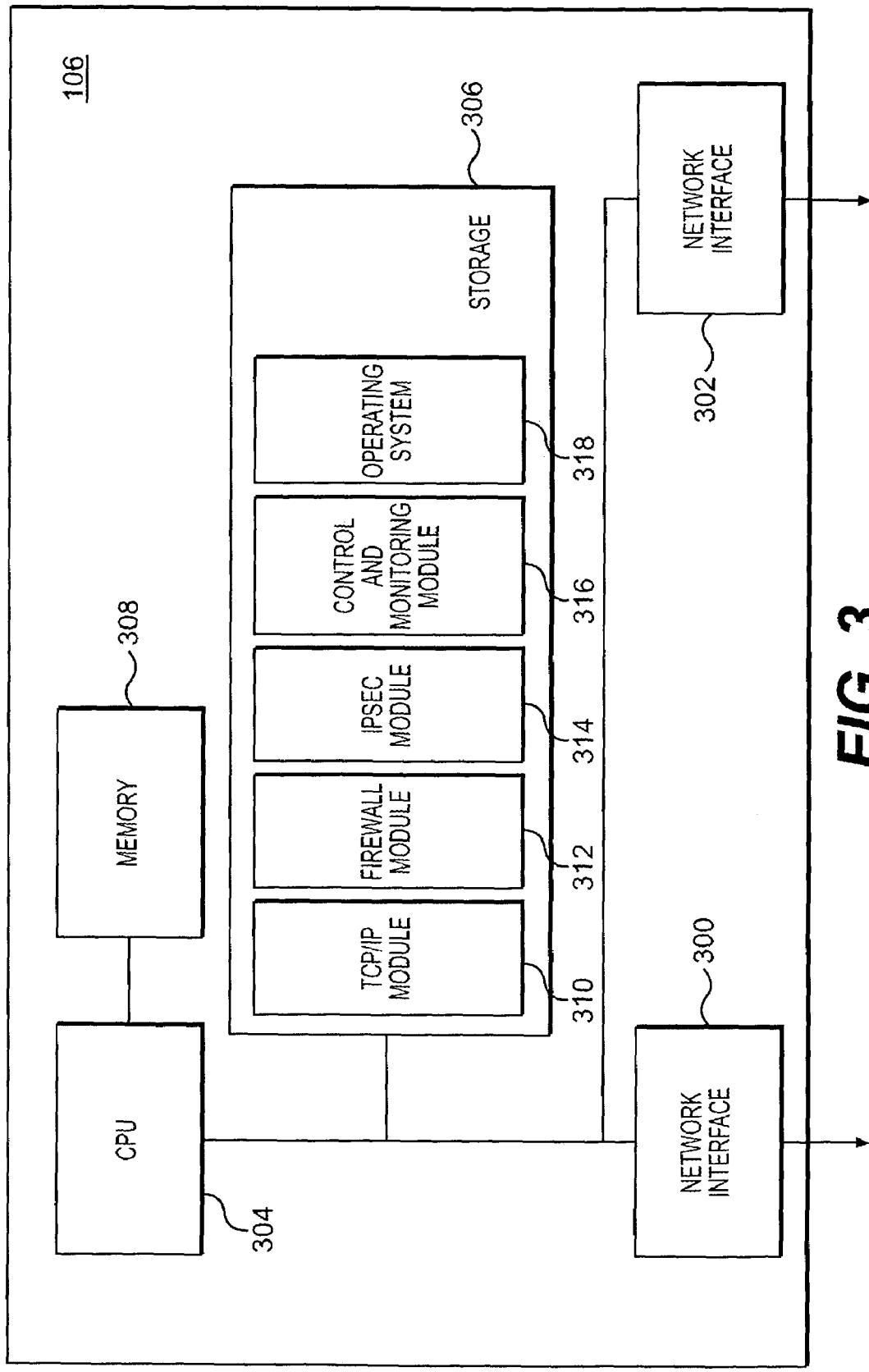
FIG. 3 is a general block diagram of an exemplary gateway, in accordance with methods and systems consistent with the present invention.

FIG. 3 is a general block diagram of an exemplary gateway, in which methods and systems consistent with the present invention may be implemented. Gateway 106 may include network interfaces 300 and 302, a central processing unit (CPU) 304, a storage module 306, and a memory 308. Gateway 106 may also include other devices (not shown), such as a display, a keyboard, and a printer.

Network interfaces 300 and 302 may provide a communications interface between gateway 106, base network 104, and network 110. For example, network interface 300 may be connected to network 110 and network interface 302 may be connected to base network 104. Network interfaces 300 and 302 may receive and transmit communications.

Although FIG. 3 illustrates a single CPU 304, gateway 106 may alternatively include multiple CPUs. CPU 304 may also include, for example, one or more of the following: a coprocessor, memory, registers, and other processing devices and systems as appropriate.

Storage 306 may be embodied with a variety of components or subsystems including, for example, a hard drive, an optical drive, a general-purpose storage device, a removable storage device, and/or other devices capable of storing information. Further, although storage 306 is illustrated in FIG. 3 as being separate or independent from CPU 304, storage 306 and CPU 304 may be implemented as part of a single platform or system.

Storage 306 may include program code and information for configuring gateway 106. Storage 306 may include program code for: a TCP/IP communications module 310, a firewall module 312, an IPSec module 314, a control and monitoring module 316; an operating system 318, such as the Linux Operating System (OS) including kernel and device drivers; configuration information for the IP stack such as a Dynamic Host Configuration Protocol (DHCP) client and a DHCP Server; program code for routing packets through one or more tunnels established between gateways 106 and 108; access control information for limiting the functions performed through one or more tunnels established between gateways 106 and 108; program code for the SOCKS Proxy code; program code for a web browser; and any other software that may be installed based on the user's configuration.

In addition, the LINUX operating system may be a "hardened" version of Linux to improve the security of the operating system.

The program code and information may be included in a disk image from network operations center 102. The disk image may include, for example, a copy of the program code required to configure a personal computer as gateway 106. Alternatively, the disk image may be installed as a bootable program on gateway 106. After executing the bootable program on a computer, the bootable program may retrieve additional program code and configuration information from network operations center 102 or other secured site to configure the computer as gateway 106. Moreover, the program code may be loaded onto gateways 106 using a single disk (not shown) and/or downloaded through the base network 104. Once the program code is installed, gateway 106 may be capable of being enabled by network operations center 102 and participating in one or more virtual networks or virtual private networks through the base network 104.

Memory 308 may provide a primary memory for CPU 304, such as for instructions for program code. Memory 308 may be embodied with a variety of components of subsystems, including, a random access memory ("RAM"), and a read-only memory ("ROM"). For example, when gateway 106 loads the disk image into storage 306, CPU 304 may download at least a portion of the program code contained in the disk image into memory 308. As CPU 304 executes the program code, CPU 304 may also retrieve additional portions of program code from storage 306.

Figure 4:
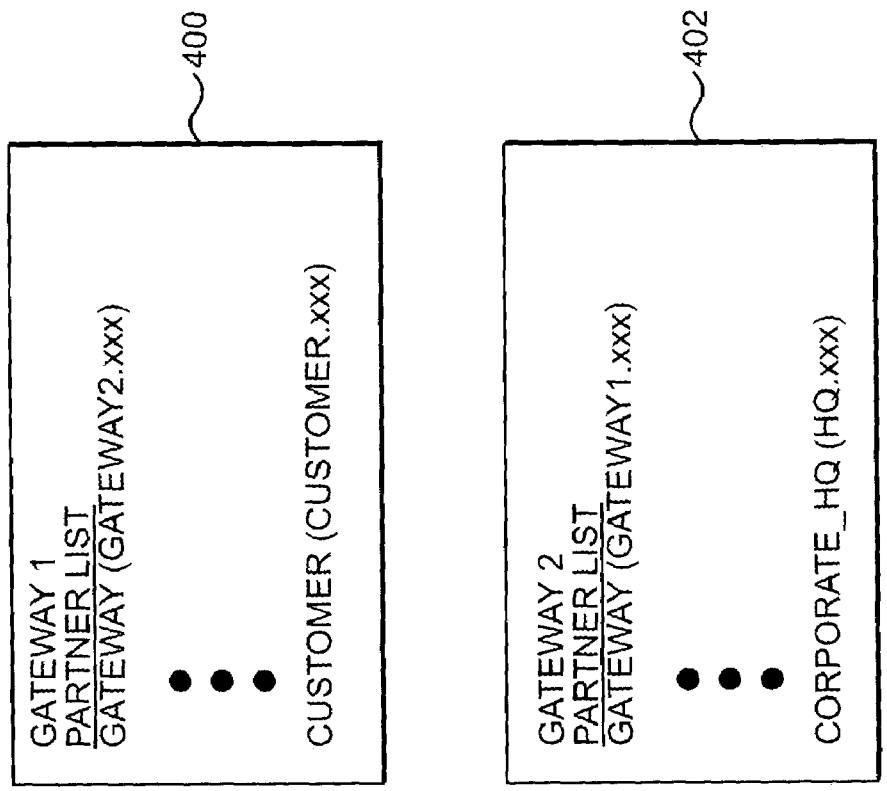
FIG. 4 illustrates exemplary partner lists, in accordance with methods and systems consistent with the present invention.

FIG. 4 illustrates exemplary partner lists, in accordance with methods and systems consistent with the present invention. Gateways 106 and 108 may consent to enabling one or more tunnels with another gateway by providing network operations center 102 a list of desired gateways from which it consents to enabling one or more tunnels. For example, network operations center 102 may determine whether two gateways consent to enabling third encrypted information flow 126 between the two gateways. If so, network operations center 102 may place each gateway on a partner list of the other gateway. Accordingly, the partner list may reflect the mutual consent of the two gateways to enable third encrypted information flow 126 between the two gateways.

For example, network operations center 102 may generate for gateway 106 a partner list 400 that lists gateway 108 as a partner. Similarly, network operations center 102 may generate for gateway 108 a partner list 402 that also lists gateway 106. Network operations center 102 may store partner lists 400 and 402, for example, in a database accessible by database server 210. This database may store each gateway's name with partner lists 400 and 402.

Partner lists 400 and 402 may include each partner's virtual IP address, public portion of the public key, firewall information, and other stored information. As a result, network operations center 102 may enable third encrypted information flow 126 between gateways 106 and 108 by determining that each gateway consents to enabling third encrypted information flow 126 and providing sufficient information, such as partner lists 400 and 402 that includes each partner's virtual IP address, public portion of the public key, firewall information, etc. to each gateway such that gateways 106 and 108 are capable of establishing third encrypted information flow 126.

Figure 5:
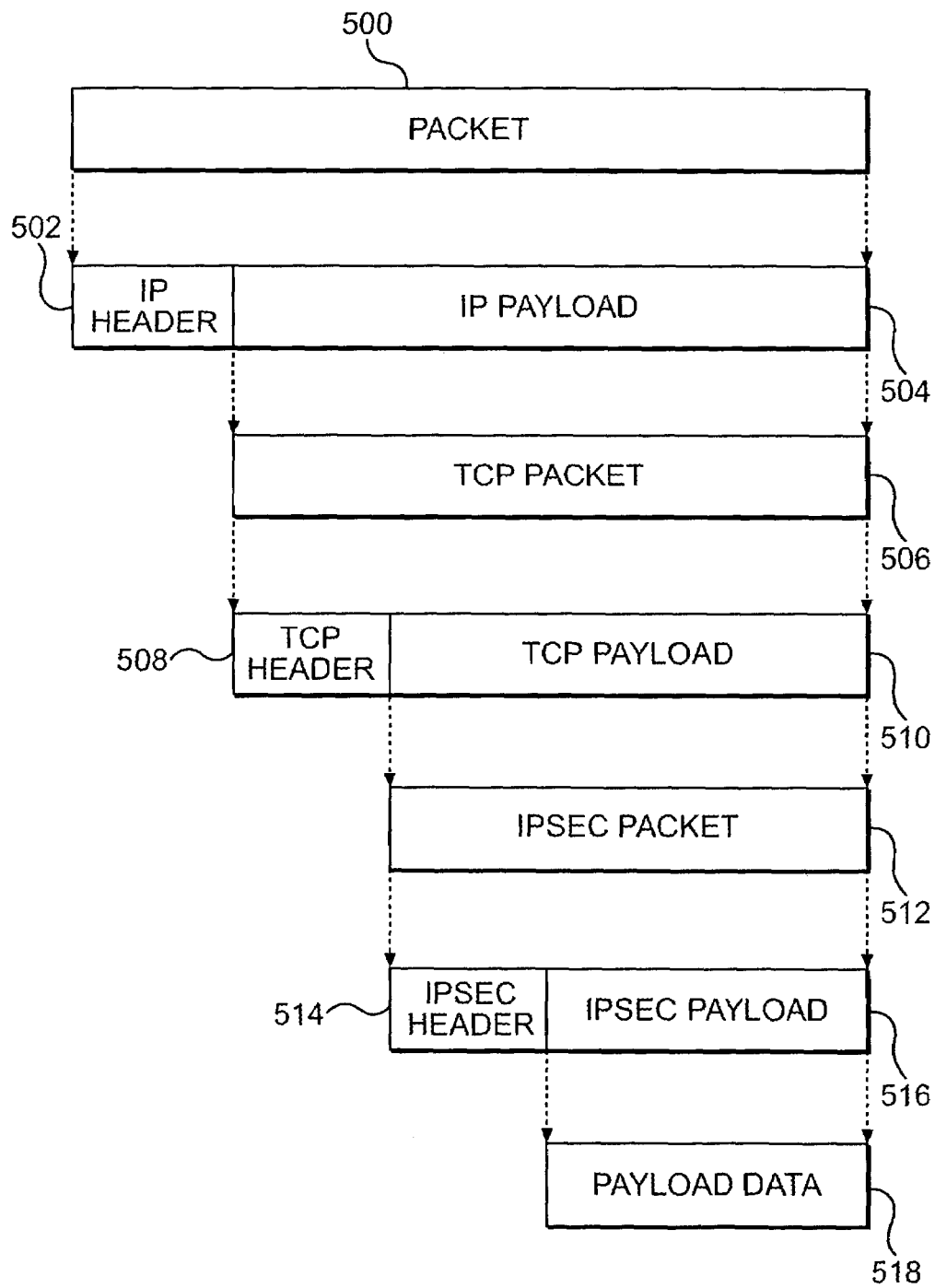
FIG. 5 is an exemplary diagram illustrating a packet communicated over a virtual private network, in accordance with methods and systems consistent with the present invention.

FIG. 5 is an exemplary diagram illustrating a packet communicated over a virtual private network, in accordance with methods and systems consistent with the present invention. As shown, a packet 500 may include an IP header portion 502 and an IP payload portion 504. The IP header portion 502 may include information for enabling gateways 106 and 108, and network operations center 102 to forward the packet 500 through base network 104. For example, the IP header portion 502 may include the real IP address of the tunnel interface driver 202 in the network operations center 102 and the real IP address of gateways 106 and 108 (e.g., at network interface 302 in gateway 106).

The IP payload portion 504 may encapsulate a TCP packet 506. The TCP packet 506 may include a TCP header portion 508 and a TCP payload portion 510. The TCP header portion 508 may include information for a TCP tunnel, such as for first encrypted information flow 122 between gateway 106 and network operations center 102 and third encrypted information flow 126 between gateways 106 and 108. For example, the TCP header portion 508 may include a destination port number of 551.

The TCP payload portion 510 may encapsulate and encrypt an IPSec packet 512. As described above, the IPSec packet 512 may be consistent with the IPSec standard to form an encrypted tunnel, such as for first encrypted information flow 122. The IPSec packet 512 may include an IPSec header portion 514 and an IPSec payload portion 516. For example, for first encrypted information flow 122, the IPSec header portion 514 may include: the virtual IP address of gateway 106; the virtual IP address of network operations center 102; and information for authentication, data integrity, and encryption consistent with the IPSec standard. Alternatively, for third encrypted information flow 126, the IPSec header portion 514 may include: the virtual IP address of gateway 106; the virtual IP address of gateway 108; and information for authentication, data integrity, and encryption consistent with the IPSec standard. The IPSec payload portion 516 may encapsulate and encrypt payload data 518 from, for example, gateway 106. The payload data 518 may include, for example, application user data, and control and monitoring information from the gateway 106 to network operations center 102, or application and user data from workstation 118 to host 116.

FIG. 6 is an exemplary list (or table) for providing security between a base network 104 and a virtual private network established between networks 110 and 112, in accordance with methods and systems consistent with the present invention. A table 600 residing in gateway 106 may include a rule index column 602; an incoming interface column 604; an outgoing interface column 606; a source address column 608; a source port column 610; a destination address column 612; a destination port column 614; a protocol options column 616; and a description column 618.

The information in columns 602-618 of table 600 may be based on information received via XML name value pairs from network operations center 102. For example, network operations center 102 may provide the XML pairs to gateway 106 for configuring firewall module 312. Gateway 106 may create table 600 based on the information in the XML pairs and store table 600 in storage 306. Firewall module 312 may then refer to table 600 and determine how to restrict a packet, such as whether to allow or disallow a packet. Control and monitoring module 316 may compile log information about each packet that is allowed or disallowed. Control and monitoring module 316 may then provide the log information to network operations center 102.

Rule index column 602 may provide information, such as a sequence number, for indicating an order in which the rule is executed in relation to other rules. Firewall module 312 of gateway 106 may execute each rule in order until a packet is either explicitly allowed, explicitly disallowed, or until the last rule is executed. Upon executing the last rule, firewall module 312 may allow or disallow the packet by default.

Incoming interface column 604 and outgoing interface column 606 may provide information such that firewall module 312 may discriminate between the interface a packet is received and the interface a packet will be forwarded. For example, since network interface 302 is connected to base network 104, firewall module 312 may restrict a packet received from network interface 302 differently than a packet received from network interface 300 which is connected to network 110.

Source address column 608 and destination address column 612 may provide information such that firewall module 312 may classify traffic based on where a packet is from and its destination. For example, firewall module 312 may disallow packets destined to host 114 which have a source address from base network 104.

Source port column 610 and destination port column 614 may provide information such that firewall module 312 may restrict which ports, such as TCP or UDP ports, a packet is from or destined. For example, firewall module 312 may disallow certain TCP or UDP ports to be used in packets destined to host 114.

Protocol options column 616 may provide information such that firewall module 312 may evaluate a packet's type and various options, which may be set in a packet. For example, these packet types and options may include: a source-routed IP packet; a TCP packet; an acknowledge bit ("ACK bit") for TCP packets; a UDP packet; an Internet Control Message Protocol ("ICMP") packet; and a message type for an ICMP packet.

Description column 618 provides information indicating which action, such as allow or disallow, firewall module 312 should take when executing a rule. If a packet is allowed, firewall module 312 may pass the packet to another module, such as IPSec module 314, for further processing, or forward the packet for routing to its next destination. If a packet is disallowed, firewall module 312 may discard the packet and may provide an alarm notification using a local display, or via an email, such as to network operations center 102.

FIG. 7 is an exemplary list (or table) for providing security within a virtual private network, in accordance with methods and systems consistent with the present invention. As shown, a table 700 may include the following columns: a rule index column 702; a partner index column 704; an incoming interface column 706; an outgoing interface column 708; a source virtual address column 710; a source port column 712; a destination virtual address column 714; a destination port column 716; a protocol options column 718; and a description column 720. The information stored in columns 702-720 may be also based on information received via XML name value pairs from network operations center 102.

Firewall module 312 may refer to table 700 in conjunction with table 600 to determine how to restrict an encapsulated packet, such as from third encrypted information flow 126. Firewall module 312 may detect an encapsulated packet based on one or more rules in table 600. For example, table 600 may specify that packets having a TCP port of 551 indicate an encapsulated packet from an encrypted information flow. Upon detecting the encapsulated packet, firewall module 312 may determine and store an index for the encapsulated packet. The index may include any type of information, such as a label, a tag, or alphanumeric characters.

Firewall module 312 may use the index to associate a set of one or more rules with the encapsulated packet and any other packets encapsulated within the encapsulated packet. The index may be determined based on one or more of the following: 1) information in the encapsulated packet, such as interface information; 2) information identifying one or more protocols used by the encapsulated packet; 3) one or more flags for one or more protocols used by the encapsulated packet; 4) information indicating a source address or port of the encapsulated packet; and 5) information indicating a destination address or port of the encapsulated packet. For example, the information indicating a source of the encapsulated packet may indicate any element of network 100 that causes or creates the encapsulated packet, such as host 116. If host 116 was the source of the encapsulated packet, then firewall module 312 may create the index based on a virtual IP address of host 116, such as "10.33.1.2".

In one embodiment, the index may include a 32-bit binary representation of the virtual IP address of the source of the encapsulated packet. Firewall module 312 may then store the index and pass the packet to another module, such as IPSec module 314 for further processing. The further processing may include, for example, de-encapsulation of IPSec packet 512 from TCP packet 506, associating the index with the IPSec packet 512, and decryption of IPSec payload portion 516. Firewall module 312 may then refer to at least a portion of table 700, such as partner index column 704, based on the stored index and determine how to restrict the encapsulated packet, such as IPSec packet 512.

In another embodiment, the index may include an alphanumeric sequence to identify a source of an encapsulated packet, such as a partner name for host 116. In yet another embodiment, the index may include a value, which is determined based on the virtual IP address of the source of the encapsulated packet, such as a hash value of the virtual IP address.

In addition, firewall module 312 may identify a packet that is forwarded through base network 104 via an encrypted information flow based on the index or one or more rules in table 600. Firewall module 312 may authenticate the identity of the source of the packet by matching the index with entries in partner list 400. Firewall module 312 may then select one or more appropriate rules for filtering the packet based on matching the index with information in partner index column 704 of table 700. For example, an index of "10.33.1.2", a TCP port of 551, or a destination virtual IP address in network 112 in a packet may indicate that the packet is forwarded via an encrypted information flow in base network 104. Firewall module 312 may then refer to at least a portion of table 700, such as partner index column 704, to determine how to restrict the encapsulated packet, pass the packet to another module, such as IPSec module 314 for encapsulation and encryption, and forward the packet.

Rule index column 702 may provide information, such as a sequence number, for indicating an order in which the rule in table 700 is executed in relation to other rules. Firewall module 312 of gateway 106 may execute selected rules of table 700 in order until a packet is either explicitly allowed, explicitly restricted, or until the last selected rule is executed.

Partner index column 704 may provide information such that firewall module 312 may select one or more rules from at least a portion of table 700. Firewall module 312 may execute a portion of the rules in table 700 based on, for example, the index associated with an encapsulated packet and any other packets encapsulated with the encapsulated packet and information from partner list 400, such as a virtual IP address or partner name. Firewall module 312 may select one or more rules specific to a particular partner or encrypted information flow. For example, firewall module 312 may select different rules from table 700 for first encrypted information flow 122 to network operations center 102 versus the rules for third encrypted information flow 126 to gateway 106. In addition, if an encrypted information flow comprises a plurality of tunnels, then firewall module 312 may select different rules from table 700 for each tunnel.

Incoming interface column 706 and outgoing interface column 708 provide information such that firewall module 312 may discriminate between the interface a packet is received and the interface a packet will be forwarded.

Source virtual address column 710 and destination virtual address column 714 provide information such that firewall module 312 may classify traffic based on where a packet is from and its destination. For example, firewall module 312 may disallow packets destined to host 116 which have a source virtual address from network 110.

Source port column 712 and destination port column 716 provide information such that firewall module 312 may restrict which ports, such as TCP or UDP ports, a packet is from or destined. For example, firewall module 312 may disallow certain TCP or UDP ports to be used in packets destined to host 116.

Protocol options column 718 provides information such that firewall module 312 may evaluate a packet's type and various options, which may be set in a packet. For example, these packet types and options may include: a source-routed IP packet; a TCP packet; an acknowledge bit ("ACK bit") for TCP packets; a UDP packet; an Internet Control Message Protocol ("ICMP") packet; and a message type for an ICMP packet.

Description column 720 provides information indicating which action, such as allow or disallow, firewall module 312 should take when executing a rule. If a packet is allowed, firewall module 312 may pass the packet to another module, such as IPSec module 314, for further processing, or forward the packet for routing to its next destination. If a packet is disallowed, firewall module 312 may discard the packet and may provide an alarm notification using a display, or via an email, such as to network operations center 102.

Figure 8:
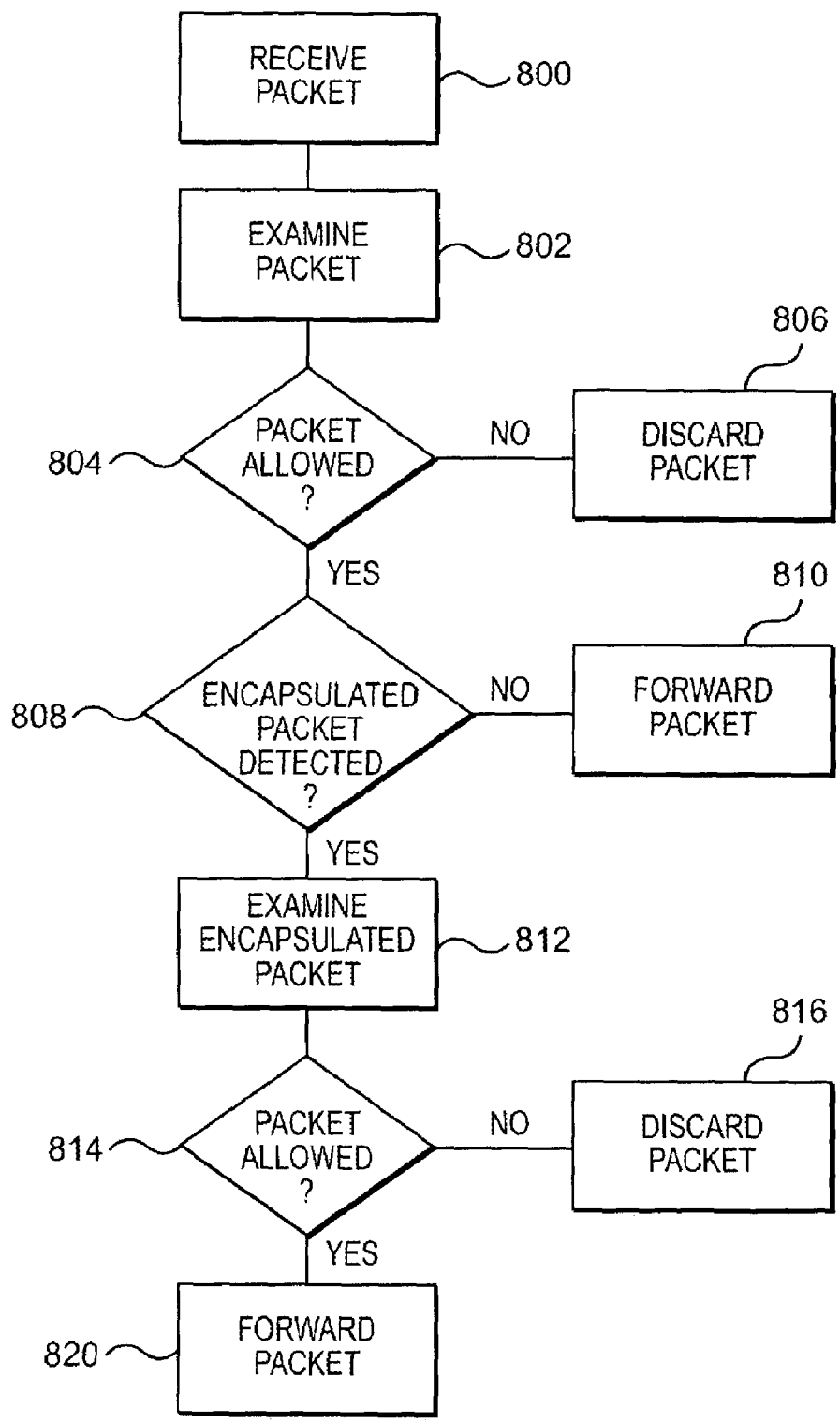
FIG. 8 is an exemplary flow chart for evaluating a packet received from a base network, in accordance with methods and systems consistent with the invention.

FIG. 8 is an exemplary flow chart of a method for evaluating a packet received from a base network, in accordance with methods and systems consistent with the invention. In stage 800, a gateway receives a packet from base network 104. For example, gateway 106 may use network interface 302 to receive packet 500 from base network 104.

In stage 802, gateway 106 may examine packet 500. For example, network interface 302 may pass packet 500 to TCP/IP module 310. TCP/IP module 310 may then pass packet 500 to firewall module 312. Firewall module 312 may refer to table 600 and examine packet 500. For example, firewall module 312 may examine information in IP header portion 502 based on rules in table 600.

In stage 804, firewall module 312 may determine whether to allow or disallow packet 500 based on the rules in table 600. Firewall module 312 may execute each rule in table 600 until packet 500 is either explicitly allowed, explicitly disallowed, or the last rule has been reached whereupon packet 500 may be allowed or disallowed by default. If packet 500 is disallowed, then processing may flow to stage 806 where firewall module 312 discards packet 500. In addition, firewall module 312 may provide an alarm notification and report the discarded packet to control and monitoring module 316.

If packet 500 is allowed, then processing may flow to stage 808 where firewall module 312 may detect an encapsulated packet, such as IPSec packet 512, within packet 500. For example, firewall module 312 may detect an encapsulated packet based on TCP packet 506 having a TCP port of 551.

If an encapsulated packet is not detected, then processing may flow to stage 810 where firewall module 312 allows packet 500. For example, firewall module 312 may pass packet 500 to TCP/IP module 310. TCP/IP module 310 may then forward packet 500 to its next destination. For example, if packet 500 is destined for workstation 118, then TCP/IP module 310 may forward packet 500 via network interface 300 and network 110. In network 110, packet 500 may then be routed to workstation 118.

If an encapsulated packet is detected, then processing may flow to stage 812. Firewall module 312 may determine and store an index that is based on information in the encapsulated packet, such as a virtual IP address of the source of packet 500, and may then pass packet 500 to IPSec module 314 for further processing. For example, IPSec module 314 may de-encapsulate TCP packet 506 to obtain IPSec packet 512. IPSec module 314 may then examine and decrypt IPSec packet 512 based on information in IPSec header portion 514 and partner list 400. IPSec module 314 may then return IPSec packet 512 in decrypted form to firewall module 312.

Firewall module 312 may examine the stored index, IPSec header portion 514 and IPSec payload portion 516 to select one or more rules from table 700. For example, IPSec header portion 514 may include a virtual IP address in network 112. Firewall module 312 may refer to partner list 400 to determine a partner name corresponding to the virtual IP address and the index. Based on matching the partner name or index to information in partner index column 704, firewall module 312 may then select one or more rules from table 700.

In stage 814, firewall module 312 may then determine whether to allow or disallow IPSec packet 512. If IPSec packet 512 is disallowed, then processing may flow to stage 816 where firewall module 312 may discard IPSec packet 512. In addition, firewall module 312 may provide a notification to control and monitoring module 316.

If IPSec packet 512 is allowed, then processing may flow to stage 818. Firewall module 312 may pass the packet to TCP/IP module 310. TCP/IP module 310 may then forward IPSec packet 512 to its next destination. For example, TCP/IP module 310 may forward IPSec packet 512 to network interface 300 and network 110.

Figure 9:
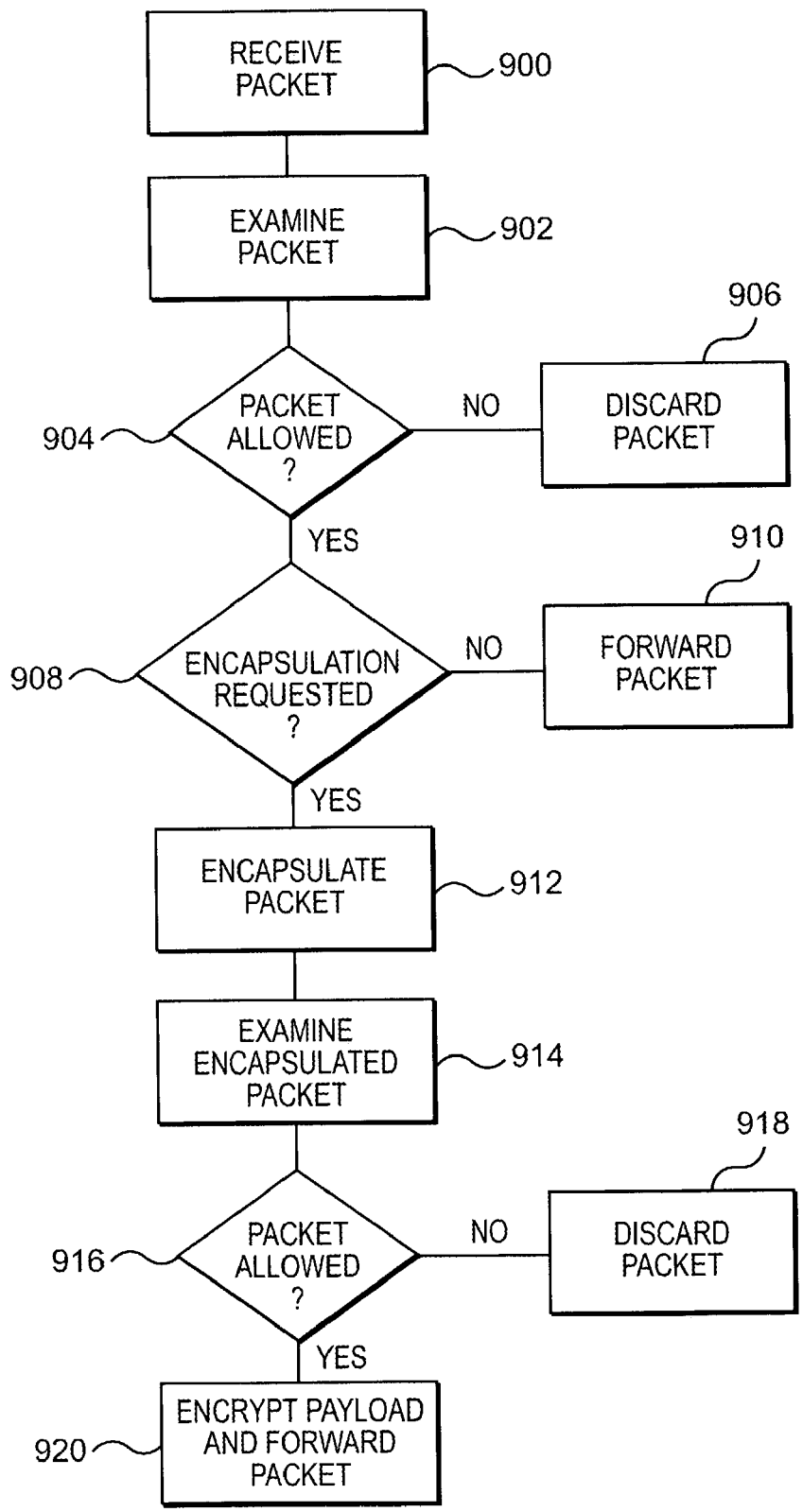
FIG. 9 is an exemplary flow chart for evaluating a packet sent to a base network, in accordance with the methods and systems consistent with the invention.

FIG. 9 is an exemplary flow chart of a method for evaluating a packet sent to a base network, in accordance with the methods and systems consistent with the invention. In stage 900, a gateway receives a packet from a private network. For example, gateway 106 may use network interface 300 to receive a packet from network 110.

In stage 902, gateway 106 may examine the packet. For example, network interface 300 may pass the packet to TCP/IP module 310. TCP/IP module 310 may then pass the packet to firewall module 312. Firewall module 312 may refer to table 600 and examine the packet based on the rules in table 600.

In stage 904, firewall module 312 may determine whether to allow or disallow the packet based on the rules in table 600. Firewall module 312 may execute each rule in table 600 until the packet is either explicitly allowed, explicitly disallowed, or the last rule has been reached whereupon the packet may be allowed or disallowed by default. If the packet is disallowed, then processing may flow to stage 906 where firewall module 312 discards the packet. In addition, firewall module 312 may provide an alarm notification and report the discarded packet to control and monitoring module 316.

If the packet is allowed, then processing may flow to stage 908 where firewall module 312 may determine whether an IPSec packet, such as IPSec packet 512, is requested. For example, firewall module 312 may determine that IPSec packet 512 is requested based on the packet having a virtual IP address in network 112 or a TCP port of 551.

If IPSec packet 512 is not requested, then processing may flow to stage 910 where firewall module 312 allows the packet. For example, firewall module 312 may pass the packet to TCP/IP module 310. TCP/IP module 310 may then forward the packet to its next destination. For example, if the packet is destined for a website in base network 104, then TCP/IP module 310 may forward the packet via network interface 302 to base network 104. In base network 104, the packet may then be routed to the website.

If IPSec packet 512 is requested, then processing may flow to stage 912. Firewall module 312 may pass the packet to IPSec module 314 for further processing. For example, IPSec module 314 may encapsulate and encrypt the packet to form IPSec packet 512. IPSec module 314 may encapsulate the packet based on the virtual IP address of the packet and information in partner list 400. IPSec module 314 may then return IPSec packet 512 to firewall module 312.

In stage 914, firewall module 312 may examine IPSec header portion 514 and IPSec payload portion 516 to select one or more rules from table 700. For example, IPSec header portion 514 may include a virtual IP address in network 112. Firewall module 312 may refer to partner list 400 to determine a partner name corresponding to the virtual IP address. Based on matching the partner name to information in partner index column 704, firewall module 312 may then select one or more rules from table 700.

In stage 916, firewall module 312 may determine whether to allow or disallow IPSec packet 512 based on the selected rules from table 700. If IPSec packet 512 is disallowed, then processing may flow to stage 918 where firewall module 312 may discard IPSec packet 512. In addition, firewall module 312 may provide a notification to control and monitoring module 316.

If IPSec packet 512 is allowed, then processing may flow to stage 918. Firewall module 312 may pass the packet to IPSec module 314. IPSec module 314 may then encrypt IPSec payload portion 516, encapsulate IPSec Packet 512 in TCP packet 506, encapsulate TCP packet 506 in packet 500, and pass packet 500 to TCP/IP module 310. TCP/IP module 310 may then forward packet 500 to its next destination. For example, TCP/IP module 310 may forward packet 500 via network interface 302 to base network 104. In base network 104, packet 500 may then be routed to gateway 108.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code (also referred to as code) to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example micro-code, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising the steps of:
   receiving a first packet from a first network;
   identifying in the first packet information for routing the first packet;
   detecting a second packet encapsulated within the first packet based on a first set of rules for processing the first packet and the information for routing the first packet;
   identifying in the first packet information for routing the second packet;
   determining an index based on the information for routing the second packet;
   determining a second set of rules for processing the second packet based on the index and the information for routing the second packet; and
   filtering the second packet based on the index, the second set of rules, and the information for routing the second packet.

2. The method of claim 1, further comprising the step of:
   forwarding the second packet to a second network interfacing the first network based on the information for routing the second packet.

3. The method of claim 1, wherein the step of filtering the second packet comprises discarding the second packet when the second packet fails to meet at least one of the second set of rules.

4. The method of claim 1, further comprising the steps of:
   receiving information from a processor interfacing the first network; and
   determining the first and second set of rules based on the information received from the processor.

5. The method of claim 1, wherein the step of detecting the second packet encapsulated within the first packet comprises identifying a port number in the information for routing the first packet.

6. The method of claim 5, wherein the step of identifying the port umber in the information for routing the first packet comprises identifying a transport control protocol port number.

7. The method of claim 5, wherein the step of identifying the port number in the information for routing the first packet comprises identifying a user datagram protocol port number.

8. The method of claim 1, wherein the step of identifying the information for routing the second packet comprises identifying a virtual address that is routable in a second network interfacing the first network.

9. The method of claim 1, wherein the step of identifying the information for routing the second packet comprises:
   selecting a portion of the first packet;
   identifying an encryption key; and
   decrypting the portion of the first packet based on the encryption key.

10. The method of claim 1, wherein the step of determining the second set of rules comprises:
    identifying a source address of the second packet; and
    determining the second set of rules based on the source address.

11. The method of claim 10, wherein the step of identifying the source address of the second packet comprises determining a consent on behalf of the second network to accept one or more packets from at least one other network.

12. The method of claim 1, wherein the step of determining the index comprises:
   identifying a virtual address of a processor interfacing the first network; and
   determining the index based on the virtual address.

13. The method of claim 1, wherein the step of determining the index comprises:
   identifying a source of the second packet based on the information for routing the second packet; and
   determining the index based on the identified source of the second packet.

14. The method of claim 1, wherein the step of determining the index comprises:
   identifying a destination of the second packet based on the information for routing the second packet; and
   determining the index based on the identified destination of the second packet.

15. The method of claim 1, wherein the step of determining the second set of rules comprises:
   identifying stored sets of rules; and
   selecting one of the stored sets of rules based on the index.

16. The method of claim 1, further comprising:
   detecting at least one additional packet encapsulated within the second packet;
   identifying information for routing the at least one additional packet;
   associating the index with the at least one additional packet; and
   filtering the at least one additional packet based on the index, the second set of rules, and the information for routing the at least one additional packet.

17. An apparatus, comprising:
   means for receiving a first packet from a first network;
   means for identifying in the first packet information for routing the first packet;
   means for detecting a second packet encapsulated within the first packet based on a first set of rules for processing the first packet and the information for routing the first packet;
   means for identifying in the first packet information for routing the second packet;
   means for determining an index based on the information for routing the second packet;
   means for determining a second set of rules for processing the second packet based on the index and the information for routing the second packet; and
   means for filtering the second packet based on the index and the second set of rules and the information for routing the second packet.

18. A method, comprising the steps of:
   providing to a processor a first set of rules for filtering at least a first packet from a network;
   providing to the processor a second set of rules for filtering at least a second packet encapsulated within the first packet and received through a tunnel established through the network;
   establishing an association between the second packet and the second set of rules based on information for routing the second packet;
   selecting at least a portion of the second set of rules; and
   filtering the second packet based on the association, the first set of rules, and second set of rules.

19. The method of claim 18, wherein the step of filtering the second packet comprises discarding the second packet when the second packet fails to meet at least one of the first and second set of rules.

20. The method of claim 18, further comprising the step of forwarding the second packet to at least one other network when the second packet satisfies the first and second set of rules.

21. The method of claim 20, wherein the step of providing to the processor the second set of rules for filtering the second packet comprises providing one or more firewall rules for routing the second packet in the at least one other network.

22. The method of claim 18, wherein the step of providing to the processor the second set of rules for filtering the second packet comprises providing the second set of rules to a gateway that includes the processor and interfaces the network.

23. The method of claim 18, wherein the step of filtering the second packet comprises:
   determining an index indicating the association; and
   filtering the second packet based on the index.

24. The method of claim 18, further comprising:
   filtering at least one additional packet encapsulated within the second packet based on the association and the second set of rules.

* * * * *